United States Patent
Kondo et al.

(10) Patent No.: US 6,838,611 B2
(45) Date of Patent: Jan. 4, 2005

(54) SOLAR BATTERY MODULE AND POWER GENERATION APPARATUS

(75) Inventors: Hiroshi Kondo, Nara (JP); Nobuyoshi Takehara, Kyoto (JP); Seiji Kurokami, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/960,282

(22) Filed: Sep. 24, 2001

(65) Prior Publication Data

US 2002/0038667 A1 Apr. 4, 2002

(30) Foreign Application Priority Data

Sep. 29, 2000 (JP) ........................................ 2000-300163

(51) Int. Cl.[7] .............................................. H01L 31/00
(52) U.S. Cl. ...................................... 136/244; 136/293
(58) Field of Search ................................ 136/244, 291, 136/293; 257/431, 443

(56) References Cited

U.S. PATENT DOCUMENTS

| | | | |
|---|---|---|---|
| 4,409,537 A | * 10/1983 | Harris | ........................ 136/244 |
| 5,569,998 A | * 10/1996 | Cowan | ........................ 307/66 |
| 5,886,890 A | 3/1999 | Ishida et al. | ................... 363/71 |
| 5,951,785 A | * 9/1999 | Uchihashi et al. | ........... 136/251 |
| 6,093,885 A | 7/2000 | Takehara et al. | ............. 136/244 |
| 6,262,558 B1 | * 7/2001 | Weinberg | .................... 320/101 |
| 6,291,764 B1 | * 9/2001 | Ishida et al. | ................. 322/2 R |
| 6,300,158 B1 | * 10/2001 | Simburger et al. | ............. 438/59 |

FOREIGN PATENT DOCUMENTS

| | | |
|---|---|---|
| EP | 0 807 980 A2 | * 11/1997 |
| JP | 10-014111 | 1/1998 |

* cited by examiner

Primary Examiner—Nam Nguyen
Assistant Examiner—Brian L Mutschler
(74) Attorney, Agent, or Firm—Fitzpatrick, Cella, Harper & Scinto (57) ABSTRACT

AC module, integrating a solar battery and an inverter, can easily be connected with other plural AC modules in parallel by way of cascade connections. However, when the number of AC modules connected is improvidently increased, the current flowing through the current path or connector of the AC module exceeds a rated current. In view of this, the current detector detects a current in the collective-power current path of the AC module, and when the detected current value exceeds a value set in the reference current setting circuit, the current detector stops the inverter.

11 Claims, 13 Drawing Sheets

SOLAR BATTERY MODULE AND POWER GENERATION APPARATUS

FIELD OF THE INVENTION

The present invention relates to a solar battery module and a power generation apparatus and, more particularly, to a solar battery module comprising a solar battery and an electronic power converter, and a power generation apparatus utilizing said solar battery module.

BACKGROUND OF THE INVENTION

Recently widely available photovoltaic power generation systems include a system-association type, which supplies a commercial-use power system with AC power obtained by an inverter performing DC/AC conversion of power generated by a solar battery, and an independent type which supplies power to a load.

An AC module, integrally comprising a solar battery and an inverter circuit, for outputting AC power has recently come to practical use. As one of the configurations of the AC module, Japanese Patent Application Laid-Open No. 10-14111 proposes an AC module which enables an increase in the number of parallel-connected AC modules by sequentially repeating cascade connection.

The AC module disclosed in Japanese Patent Application Laid-Open No. 10-14111 enables easy parallel connection of plural AC modules by way of cascade connection. On the other hand, an improvident increase of the number of connections causes the current in a connector or current path of the AC module to exceed the rated current. Furthermore, if the rated current of a connector or current path of the AC module is increased on the assumption that the insolation becomes extremely intense, the cost of the AC module will increase.

SUMMARY OF THE INVENTION

The present invention has been proposed to solve each or all of the above problems, and has as its object to prevent over current flow in a solar battery module.

According to the present invention, the foregoing object is attained by providing a solar battery device comprising: a solar battery; a power converter, arranged to convert electric power outputted from the solar battery; an input connector, arranged to input electric power from outside the device; an output connector, arranged to collect the electric power inputted by the input connector and the electric power outputted by the power converter, and output the collected electric power to outside the device; a detector, arranged to detect a current value of an electric current of the output connector; and a controller, arranged to control output of the power converter when the current value detected by the detector exceeds a predetermined value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinafter, a photovoltaic power generation apparatus as an embodiment of the present invention will be described in detail with reference to the accompanying drawings.

<First Embodiment>

Figure 1:
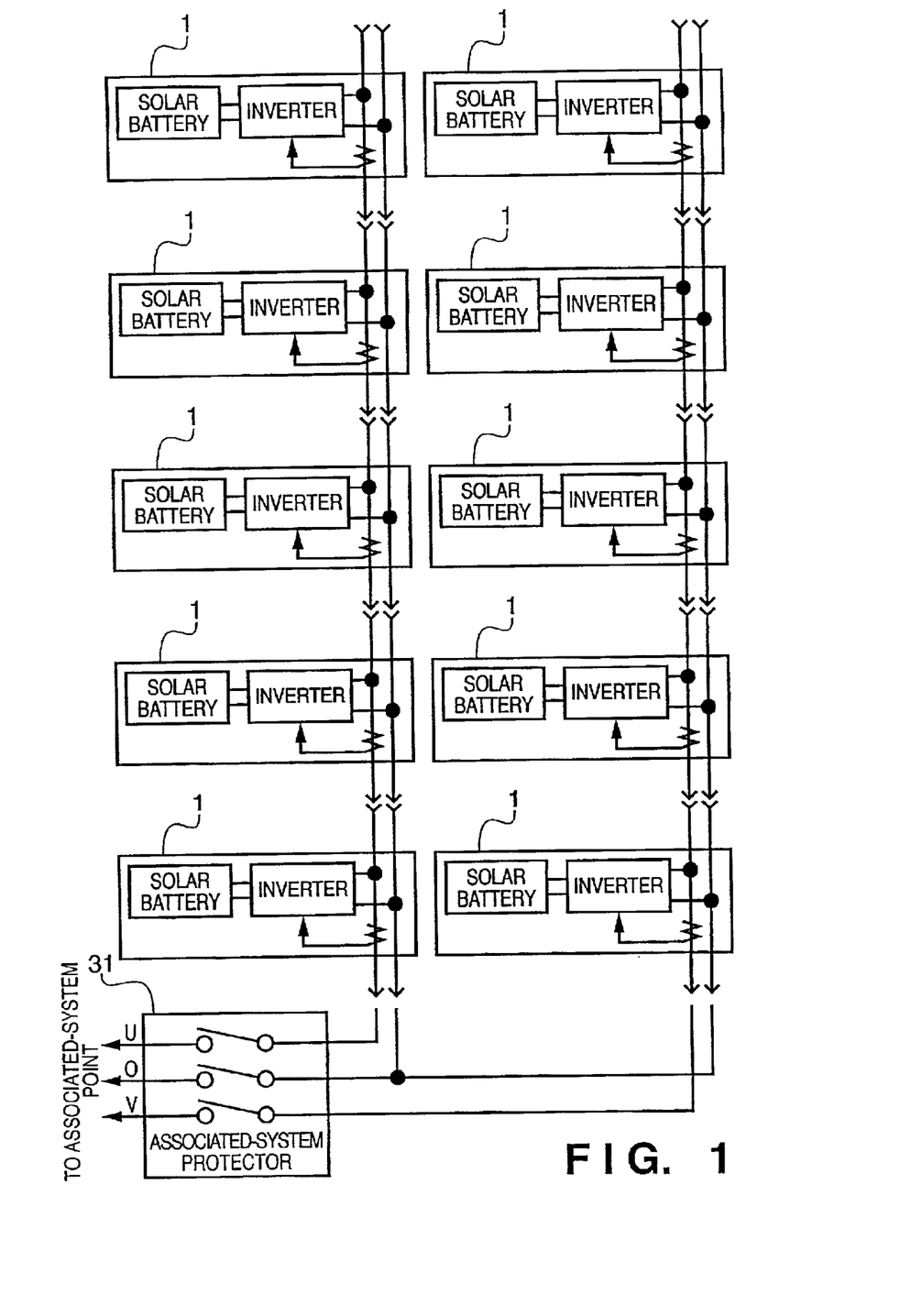
FIG. 1 is a block diagram explaining a construction of a photovoltaic power generation apparatus employing a plurality of AC modules.
Figure 2:
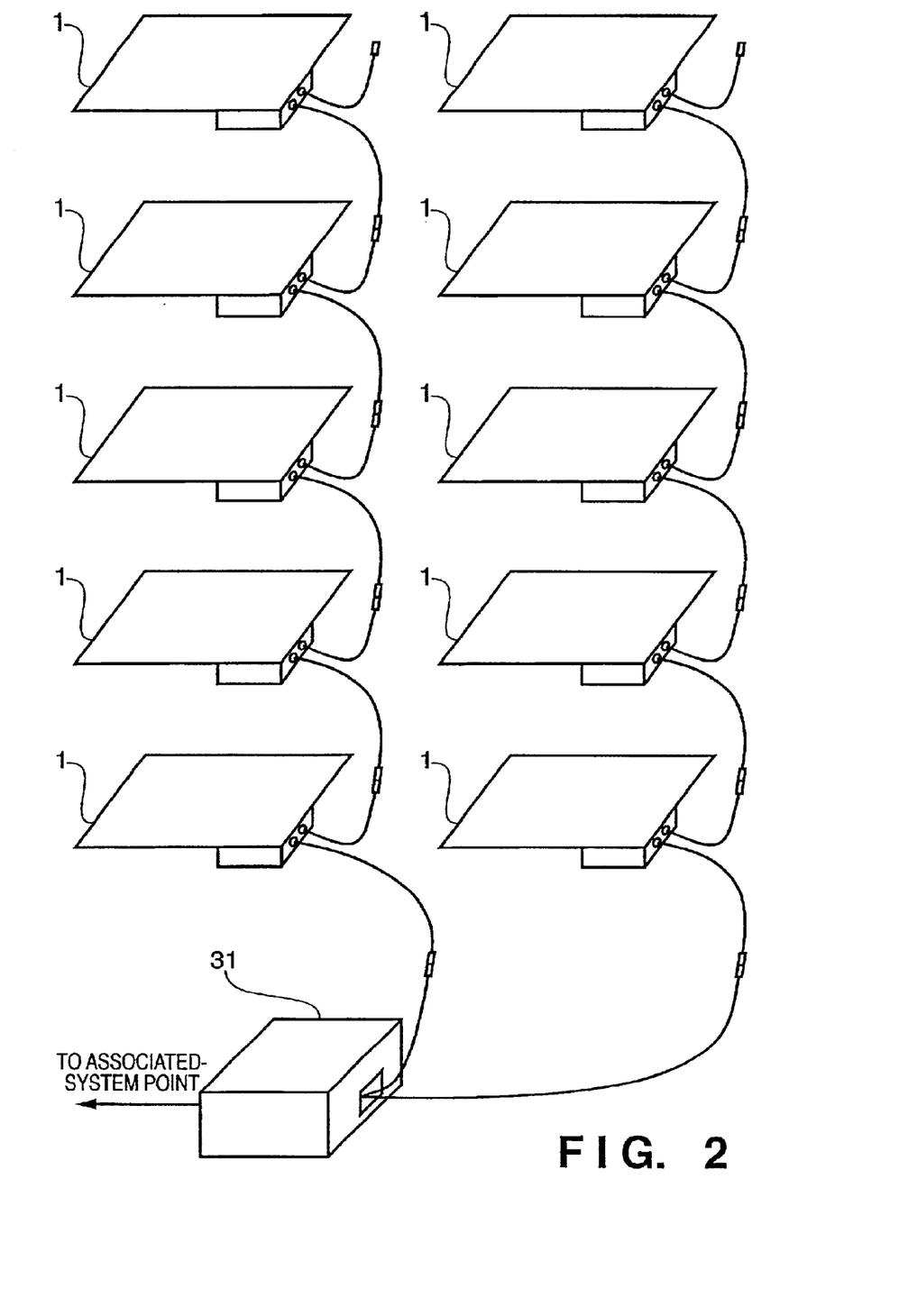
FIG. 2 is an external view of the photovoltaic power generation apparatus.

FIG. 1 is a block diagram explaining a construction of a photovoltaic power generation apparatus employing a plurality of AC modules, and FIG. 2 is an external view of the photovoltaic power generation apparatus.

The distribution line consists of two power lines U and V, and one neutral line O. The U phase and V phase respectively have AC 100V, and these distribution lines constitute a 200V single-phase three-wire power line. Therefore, each AC module 1 has a 100V single-phase output. Connecting the input connector with the output connector of the AC module 1 as shown in FIGS. 1 and 2 enables to increase the number of parallel connection of the AC module 1. FIGS. 1 and 2 show an example of connecting five AC modules 1 for each of the U phase and V phase (total of ten AC modules 1).

An associated-system protector 31, comprising a switch and a system abnormality detector, is provided between the AC module 1 and a commercial-use power system (hereinafter simply referred to as the system). When the associated-system protector 31 detects a voltage increase of the system, a frequency abnormality, a power failure or the like, it turns off the switch to disconnect the photovoltaic power generation apparatus from the system.

The 100V single-phase power, generated by the ten AC modules 1, is supplied to the U phase and V phase, and sent to the 200V single-phase three-wire system. Provided that the AC modules are connected as shown in FIG. 2, the closer the AC module 1 is to the associated-system point, the larger the current flowing in the output connector of the AC module 1.

[Main Structural Component of AC Module]

Figure 3:
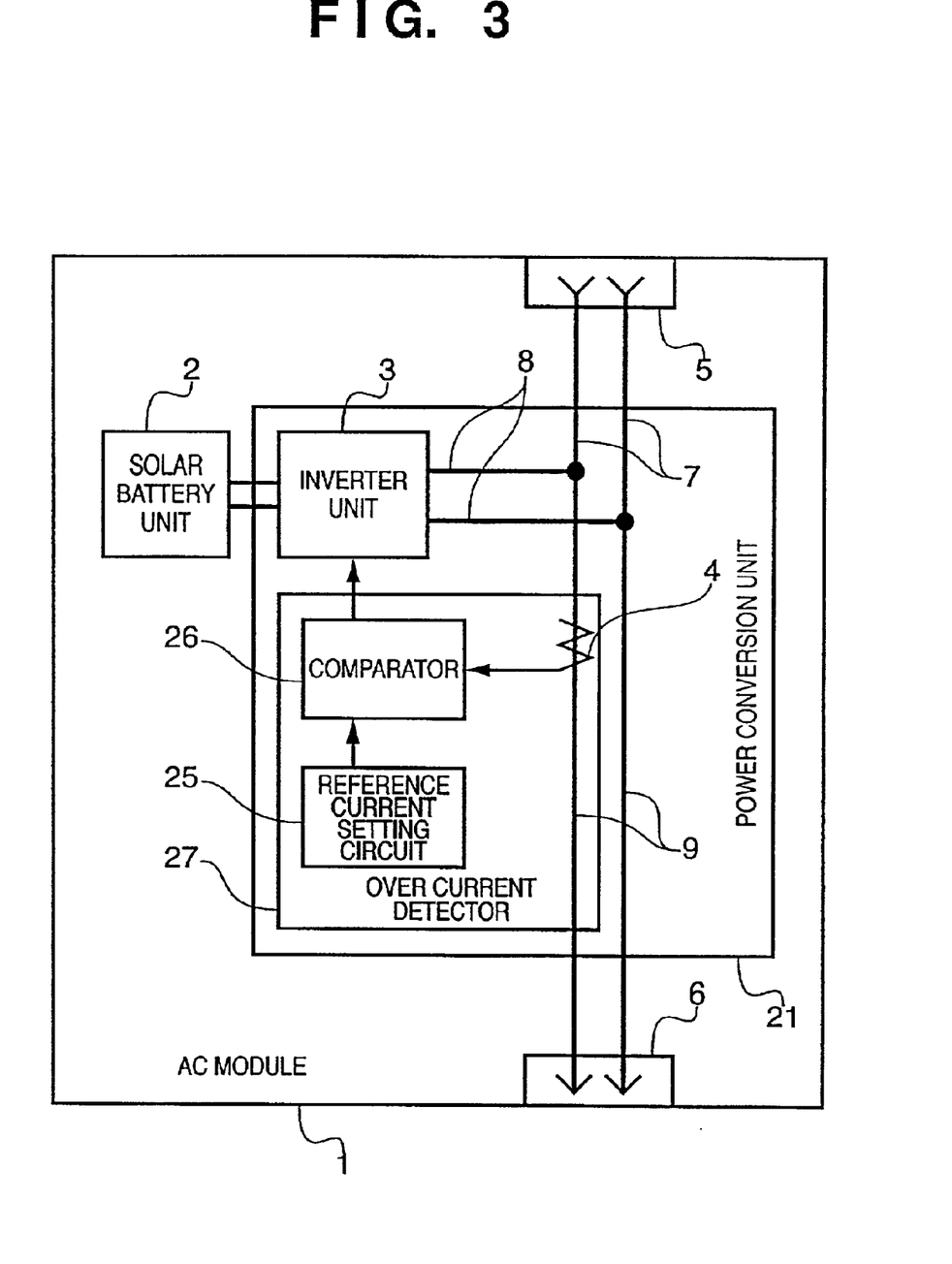
FIG. 3 is a block diagram showing a construction of an AC module according to a first embodiment.
Figure 4:
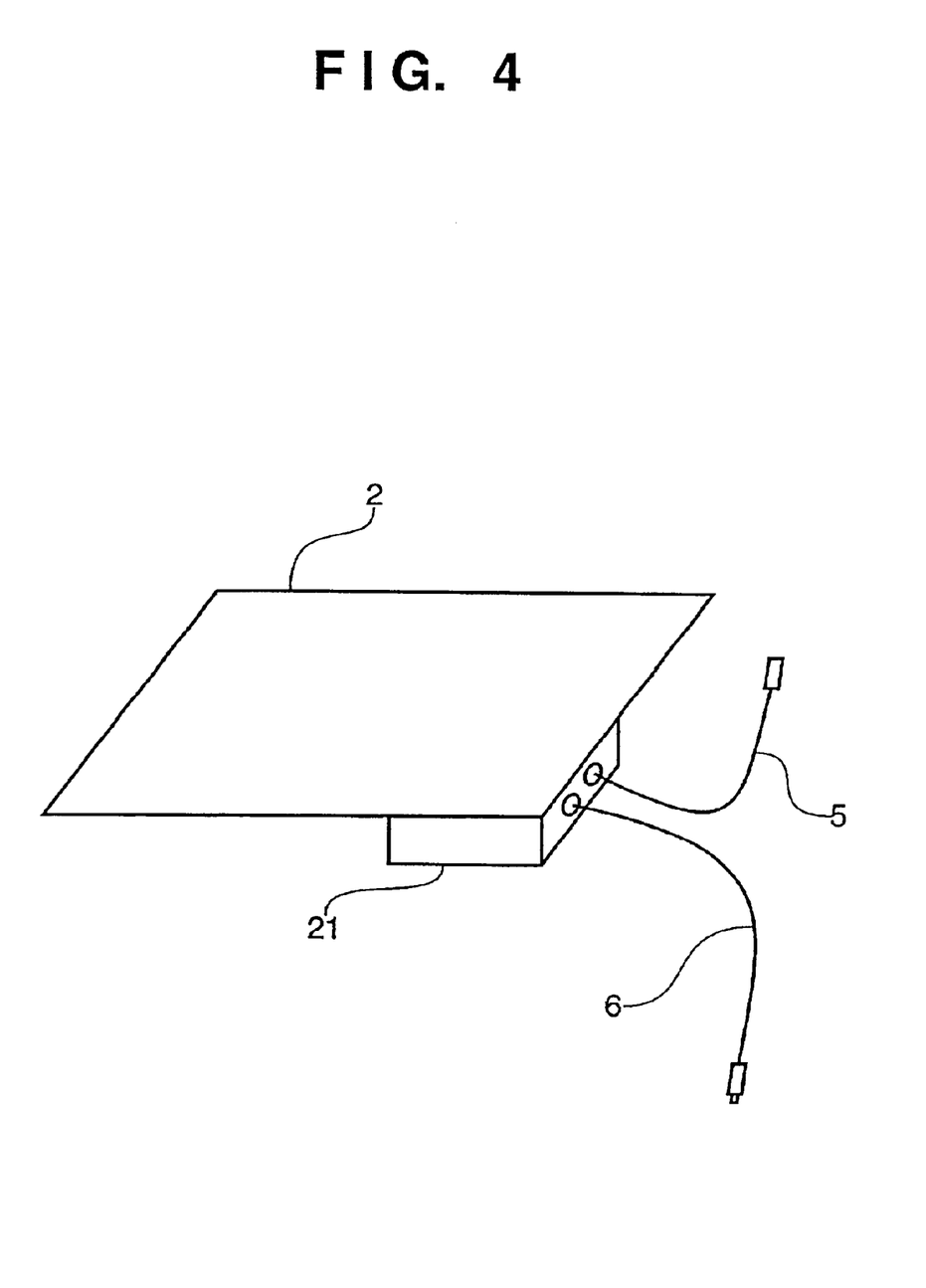
FIG. 4 is an external view of the AC module.

FIG. 3 is a block diagram showing a construction of the AC module 1, and FIG. 4 is an external view of the AC module 1.

Solar Battery Unit

As shown in FIG. 4, the solar battery unit 2 accounts for the most part of the AC module 1. Preferably used as the solar battery unit 2 is one employing amorphous silicon, or polycrystalline silicon or crystalline silicon in its photoelectronic transducer. DC power is outputted from an electrode (not shown) of the solar battery unit 2. Note when the insolation is 1 kW/m$^2$, the rated output of the solar battery unit 2 in the first embodiment is: the rated voltage, 25V; rated current, 4 A; and rated power, 100 W.

Power Conversion Unit

The power conversion unit 21 comprises an inverter unit 3, an over current detector 27, and current paths 7, 8 and 9. The power conversion unit 21 converts DC power supplied from the solar battery unit 2 to 50/60 Hz and 100V AC power. The converted AC power is collected together with AC power, which is inputted from an input connector 5, and then outputted to an output connector 6. Note in the first embodiment, the power conversion unit 21 has 90% conversion efficiency, and in a case where rated power 100 W is inputted by the solar battery unit 2, the power conversion unit 21 outputs AC power of 100V, 0.9 A and 90 W.

Inverter Unit

Figure 5:
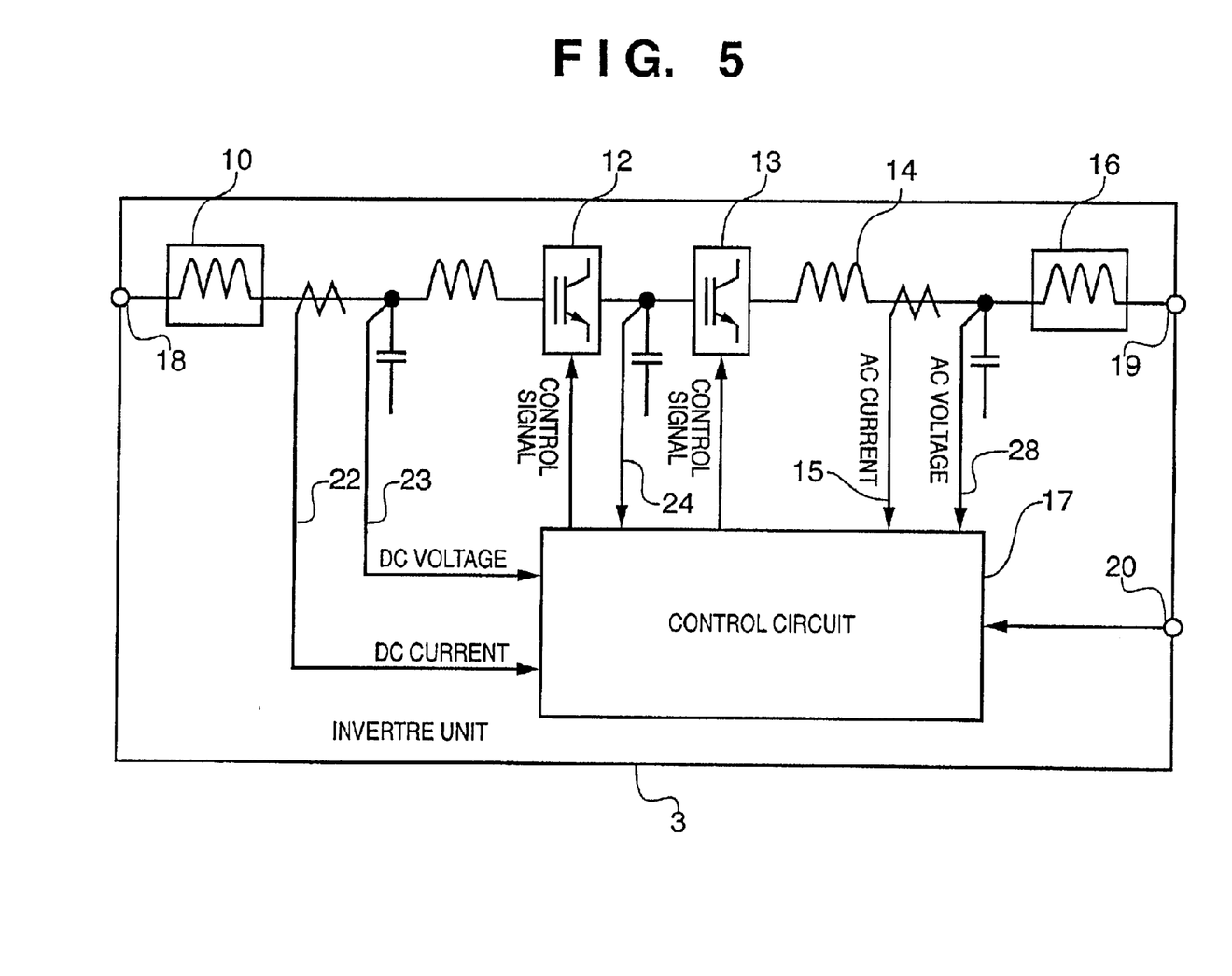
FIG. 5 is a block diagram showing a construction of an inverter unit.

FIG. 5 is a block diagram showing a construction of the inverter unit 3.

The inverter unit 3 comprises a DC input terminal 18, an input noise filter 10, a booster circuit 12, an inverter circuit 13, an association reactor 14, a control circuit 17, an output noise filter 16, an AC output terminal 19, and a signal input terminal 20. The DC voltage, about 25V, which is inputted to the DC input terminal 18, is converted to 160V DC voltage by the booster circuit 12 which includes a boost chopper. At this stage, the control circuit 17 performs the well-known optimum operation point tracking control based on DC current 22 and DC voltage 23.

The inverter circuit 13 comprises a plurality of switching elements connected by way of bridge connection. The control circuit 17, including a microprocessor and so on, generates PWM switching control signals in the following manner, which is to be supplied to the inverter circuit 13.

The control circuit 17 compares a link voltage 24, inputted to the inverter circuit 13, with a voltage command value Vref and generates an input error signal. Meanwhile, a band-pass filter extracts from AC voltage 28 a fundamental frequency component of the associated-system point voltage. Then, multiplying the input error signal by the extracted fundamental frequency component generates a current command value signal indicative of a reference value of the control. The current command value signal and AC current value 15 are computed to generate a current error signal.

A gate control circuit, serving as a part of the control circuit 17, compares the current error signal with a reference triangular wave signal, which is about 20 kHz, and generates the PWM switching control signal to be supplied to the inverter circuit 13. Note the PWM switching control signal is not outputted to the inverter circuit 13 when a halt signal is inputted from the signal input terminal 20 to the control circuit 17.

By the foregoing feedback control, the inverter unit 3 outputs AC power of power factor 1, having the same current phase as the system. Note that many other known methods of structuring the inverter unit 3 and other PWM control methods are applicable.

Over Current Detector

The over current detector 27 comprises a current detector 4, a reference current setting circuit 25, comparator 26 and so forth.

A shunt resistor connected serially to a current path for measuring a voltage on both ends of the current path, or a current sensor using a coil or a Hall element capable of detecting a current while being isolated with the current path may be used as the current detector 4. In the first embodiment, a current sensor utilizing a Hall element is employed as the current detector 4 to detect current of the current path 9.

The reference current setting circuit 25 sets a reference value to be compared with the current value, detected by the current detector 4. The reference current setting circuit 25 may be configured to output a fixed voltage, or may be configured with a variable resistor or the like to enable adjustment of the reference value.

Note in the following description, the rated value of the output connector 6 and the current path is set as the reference value. However, the reference value may be set lower than the rated value to allow a slight margin.

The comparator 26 compares an output of the current detector 4 with the set value of the reference current setting circuit 25. When the output of the current detector 4 is larger than the set value, the comparator 26 supplies an inverter halt signal to the signal input terminal 20 of the inverter unit 3.

Input and Output Connectors

The input connector 5 and output connector 6 of the AC module 1 are constructed with a connectable plug and a receptacle provided in a pair. As shown in FIG. 1, the input connector 5 of the AC module 1, which is connected at the end of the cascade connection, is unconnected. Therefore, a receptacle that does not allow easy contact with the electrically activated portion is used for the input connector 5, and a plug is used for the output connector 6.

[Operation of AC Module]

Next, an operation of the AC module 1, having the aforementioned construction, is described.

The DC power generated by the solar battery unit 2 is converted to AC power by the inverter unit 3, sent through the current path 8, collected together with the power, which is generated by other AC modules 1 and inputted from the input connector 5, then sent through the current path 9, and outputted to the output connector 6.

Accordingly, the maximum rated current value of the AC module 1 is determined by a current value, which can flow through the current path 9 to the output connector 6. In the first embodiment, the maximum rated current value of the AC module 1 is 4.5 A based on the maximum current value of the current path 9. The reference value of the reference current setting circuit 25 is set to 4.5 A, so as to have the comparator 26 send an inverter halt signal in a case where a detected current value of the current detector 4 exceeds 4.5 A.

Figure 6:
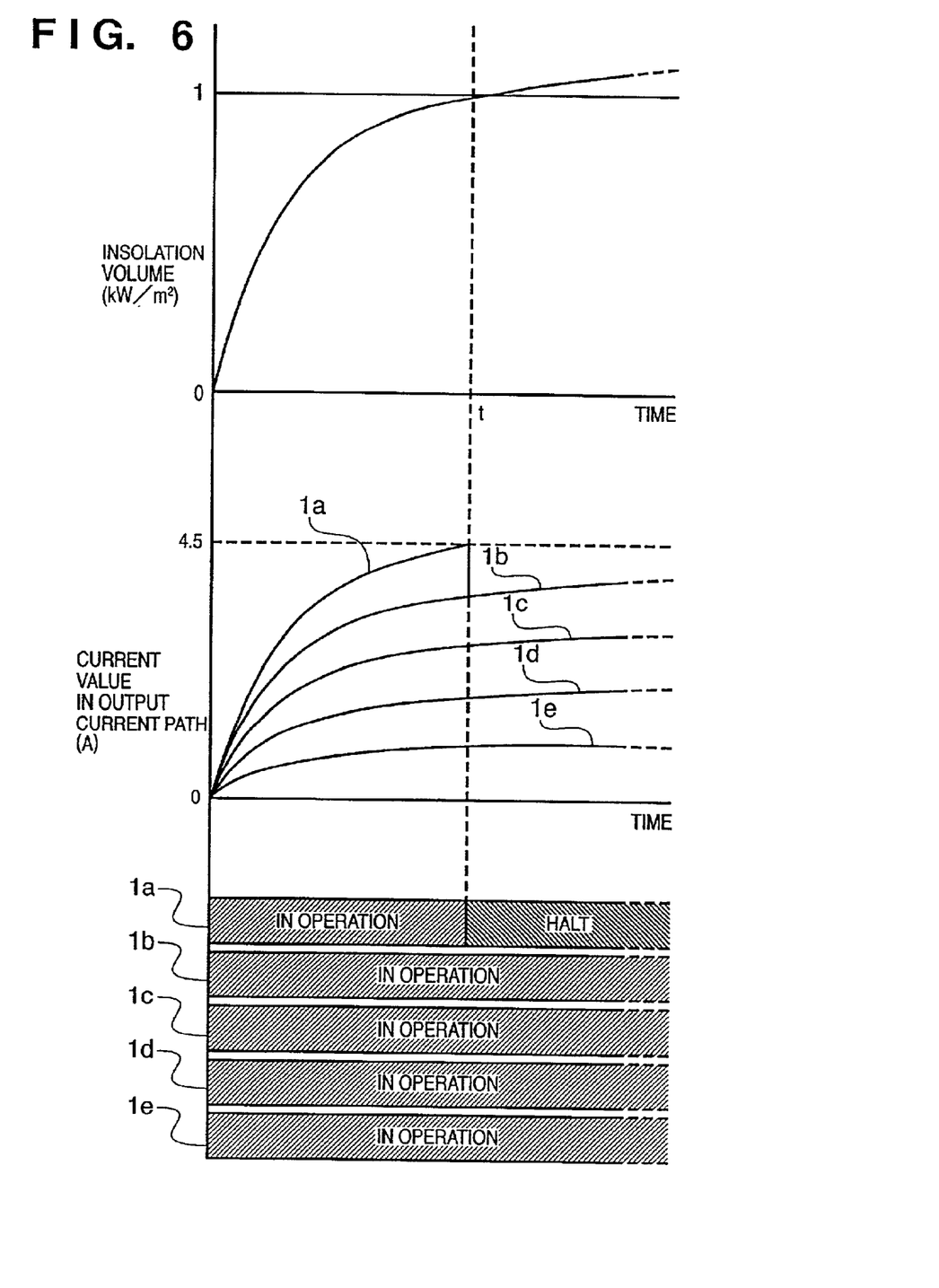
FIG. 6 is a view showing collected current values of AC modules connected in common phase and the operation state of each AC module in the photovoltaic power generation apparatus according to the first embodiment in a case where the insolation changes.

FIG. 6 is a view showing collected current values of the AC modules 1 connected in common phase and the operation state of each AC module 1 in the photovoltaic power generation apparatus shown in FIG. 1, in a case where the insolation changes. Note that the AC module closest to the associated-system point is referred to by reference 1a, and the AC module farthest from the associated-system point is referred to by reference 1e.

As shown in FIG. 6, the collected current value of each of the AC modules 1 (i.e., current value in the current path 9) increases as the insolation rises. When the insolation exceeds 1.0 kW/m² at time t, the output of each AC module 1 exceeds 0.9 A, and the total output exceeds 4.5 A.

At time t, the current detector 4 of the AC module 1a sends a detected value exceeding 4.5 A to the comparator 26. Since the reference value of the reference current setting circuit 25 is set to 4.5 A, the comparator 26 outputs an inverter halt signal. The control circuit 17, which receives the inverter halt signal, stops supplying the PWM control signal to the inverter circuit 13. The inverter circuit 13 is gate-blocked.

Meanwhile, when the insolation is 1.0 kW/m², the AC modules 1b to 1e respectively have collected current values of 0.9 A, 1.8 A, 2.7 A, and 3.6 A; thus, the operation of the inverter circuit 13 continues. In other words, the power collected from five AC modules 1 is supplied to the system until time t, and the power collected from four AC modules 1 is supplied to the system after time t.

As described above, in the AC module 1 according to the first embodiment, it is possible to prevent over current flow in the current path 9 and the output connector 6. Unlike the configuration where the associated-system protector 31 detects an over current and disconnects the switch therein, even in a case where a sudden increase is found in the insolation, AC modules 1 other than the one closest to the associated-system point can continue their operation because power conversion of the AC module 1 is halted sequentially from the one closest to the associated-system point.

<Second Embodiment>

Hereinafter, a photovoltaic power generation apparatus according to the second embodiment of the present invention is described. Note in the second embodiment, the configuration same as that in the first embodiment is referred to by the identical reference numerals and detailed description thereof will be omitted.

Figure 7:
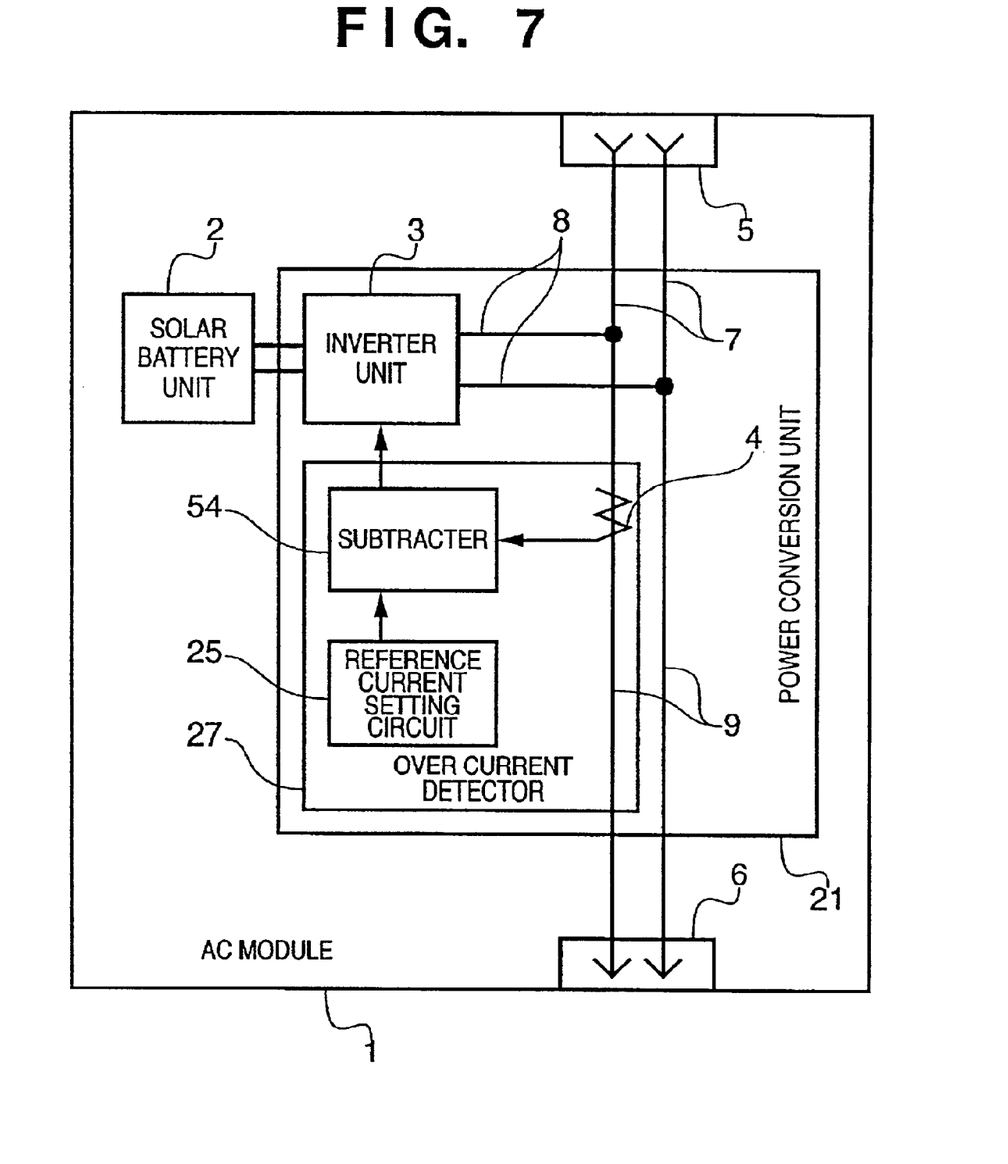
FIG. 7 is a block diagram showing a construction of an AC module according to a second embodiment.

When a detected value of the current detector 4 exceeds a set value, the output of the AC module 1 is halted in the first embodiment. In contrast, according to the second embodiment, the output of the AC module 1 is reduced such that the detected value of the current detector 4 does not exceed the set value.

FIG. 7 is a block diagram showing a construction of the AC module 1 according to the second embodiment. In place of the comparator 26 shown in the construction of the AC module 1 in FIG. 3, a subtracter 54 is provided.

The subtracter 54 subtracts the set value of the reference current setting circuit 25 from the output of the current detector 4. When the obtained result is positive, the obtained value is outputted, but when the result is negative, zero is outputted as an output reduction signal.

The control circuit 17 computes the aforementioned current command value signal, AC current value 15, and output reduction signal which is inputted from the subtracter 54 through the signal input terminal 20 to generate a current error signal. As mentioned above, the gate control circuit, which receives the current error signal, compares the current error signal with the reference triangular wave signal which is about 20 kHz, and generates the PWM switching control signal to be supplied to the inverter circuit 13.

Provided that the maximum rated current of the AC module 1 in the second embodiment is 4.5 A as in the first embodiment, the set value of the reference current setting circuit 25 is 4.5 A. When a detected value of the current detector 4 exceeds 4.5 A, the subtracter 54 outputs the output reduction signal to the control circuit 17. The control circuit 17 generates a current error signal by reducing the current command value signal for the level of, e.g., the output reduction signal, so as to reduce the output current of the inverter circuit 13.

Figure 8:
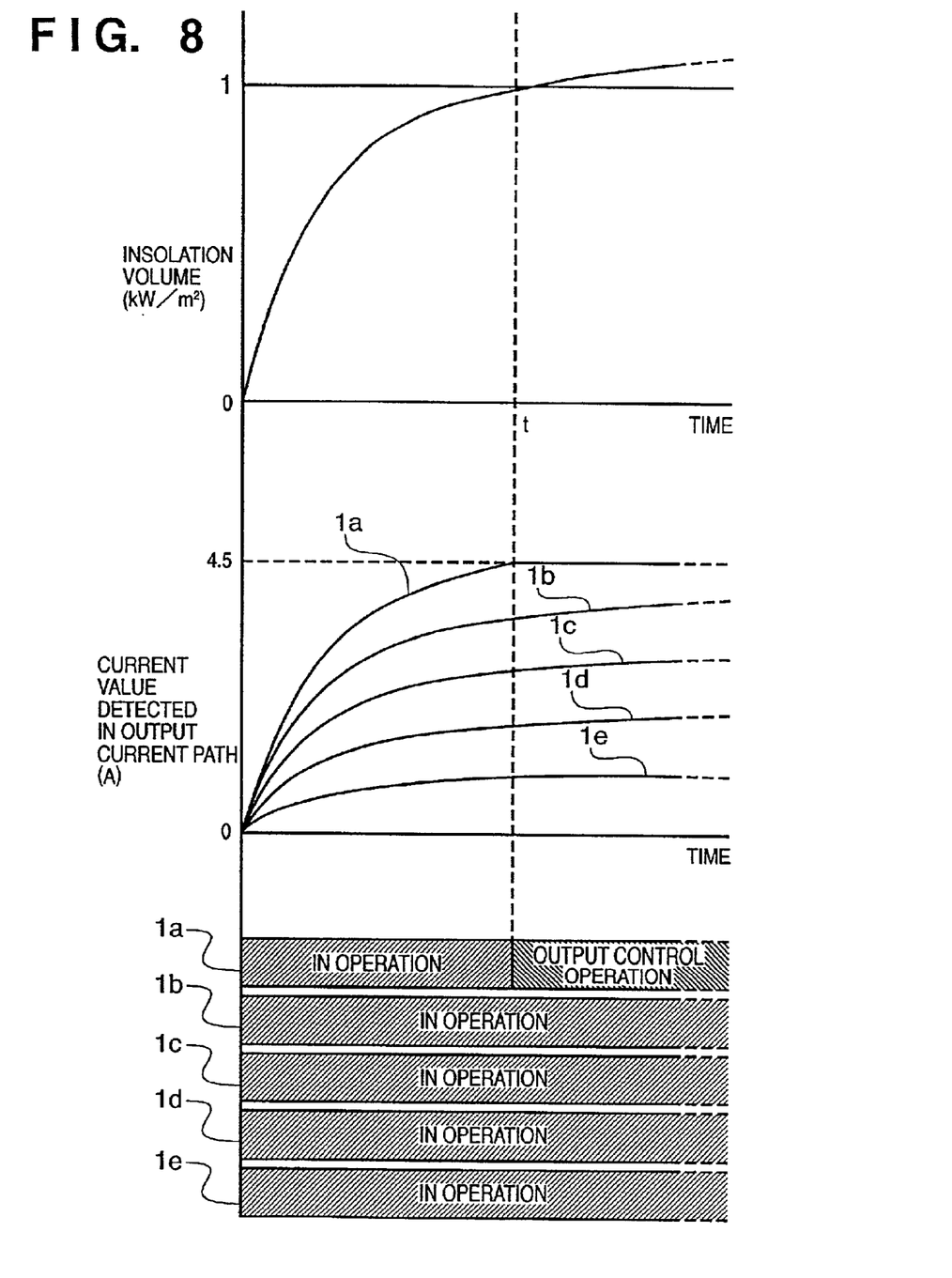
FIG. 8 is a view showing collected current values of AC modules connected in common phase and the operation state of each AC module in the photovoltaic power generation apparatus according to the second embodiment in a case where the insolation changes.

FIG. 8 is a view showing collected current values of the AC modules 1 connected in common phase and the operation state of each AC module 1 in the photovoltaic power generation apparatus shown in FIG. 1, in a case where the insolation changes. Note that the AC module closest to the associated-system point is referred to by reference 1a, and the AC module farthest from the associated-system point is referred to by reference 1e.

As shown in FIG. 8, the collected current value of each of the AC modules 1 (current value in the current path 9) increases as the insolation rises. When the insolation exceeds 1.0 kW/m² at time t, the output of each AC module 1 exceeds 0.9 A, and the total output exceeds 4.5 A.

At time t, the current detector 4 of the AC module 1a sends a detected value exceeding 4.5 A to the subtracter 54. Since the reference value of the reference current setting circuit 25 is set to 4.5 A, the subtracter 54 outputs an output reduction signal. The control circuit 17, which receives the output reduction signal, suppresses the output power of the inverter circuit 13, thereby changing the operation of the AC module 1a to the output control operation.

Meanwhile, when the insolation is 1.0 kW/m², the AC modules 1b to 1e, respectively having collected current values of 0.9 A, 1.8 A, 2.7 A, and 3.6 A, continue their normal operation. Therefore, the power collected from five AC modules 1 in the normal operation state is supplied to the system until time t. After an elapse of time t, the power collected from four AC modules 1 in the normal operation state and one AC module 1 in the output-control operation state is supplied to the system.

As described above, in the AC module 1 according to the second embodiment, it is possible to prevent over current flow in the current path 9 and the output connector 6. Even if a sudden increase is found in the insolation, the output power of the AC module 1 is suppressed from the one closest to the associated-system point, and other AC modules 1 can continue their operation. By virtue of this, the second embodiment can utilize generated power of the solar battery unit 2 more efficiently than the photovoltaic power generation apparatus of the first embodiment.

<Third Embodiment>

Hereinafter, a photovoltaic power generation apparatus according to the third embodiment of the present invention is described. Note in the third embodiment, the configuration same as that in the first embodiment is referred to by the identical reference numerals and detailed description thereof will be omitted.

The first and second embodiments employ the AC module 1 connected to a single-phase two-wire system line. The third embodiment employs an AC module 1 connected to a single-phase three-wire system line.

Figure 9:
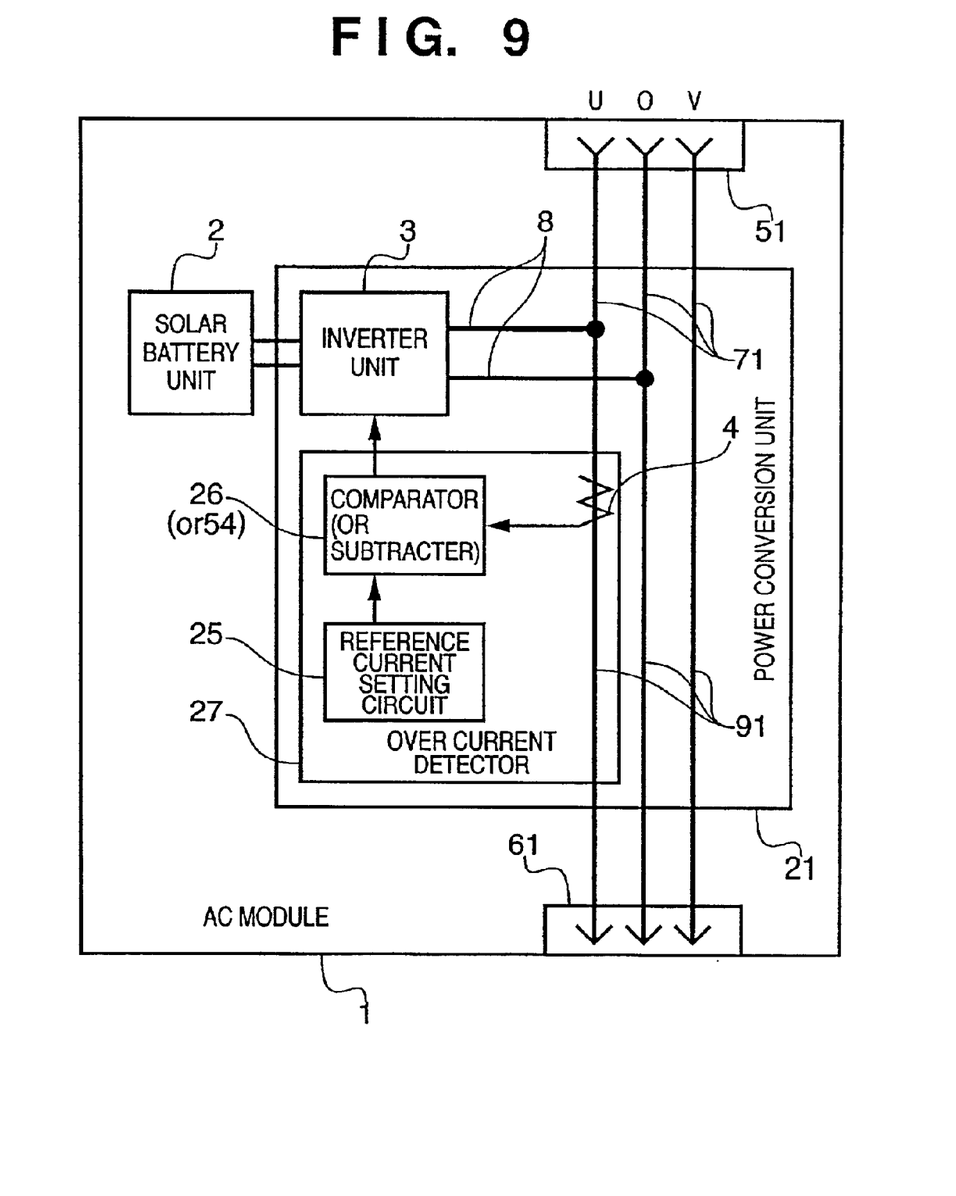
FIG. 9 is a block diagram showing a construction of an AC module connected to a single-phase three-wire system line.

FIG. 9 is a block diagram showing a construction of the AC module 1 connected to a single-phase three-wire system line. Although FIG. 9 shows a structure for supplying power to the U-phase line, power may be supplied to the V-phase line as shown in FIG. 10.

Unlike the AC module 1 shown in FIGS. 3 and 7, the input connector 51 and output connector 61 of the AC module 1 according to the third embodiment are three-pole connectors. The current detector 4 is arranged in the phase where power of a collective-power current path 91 is collected, i.e., the phase to which the inverter unit 3 is connected.

Figure 10:
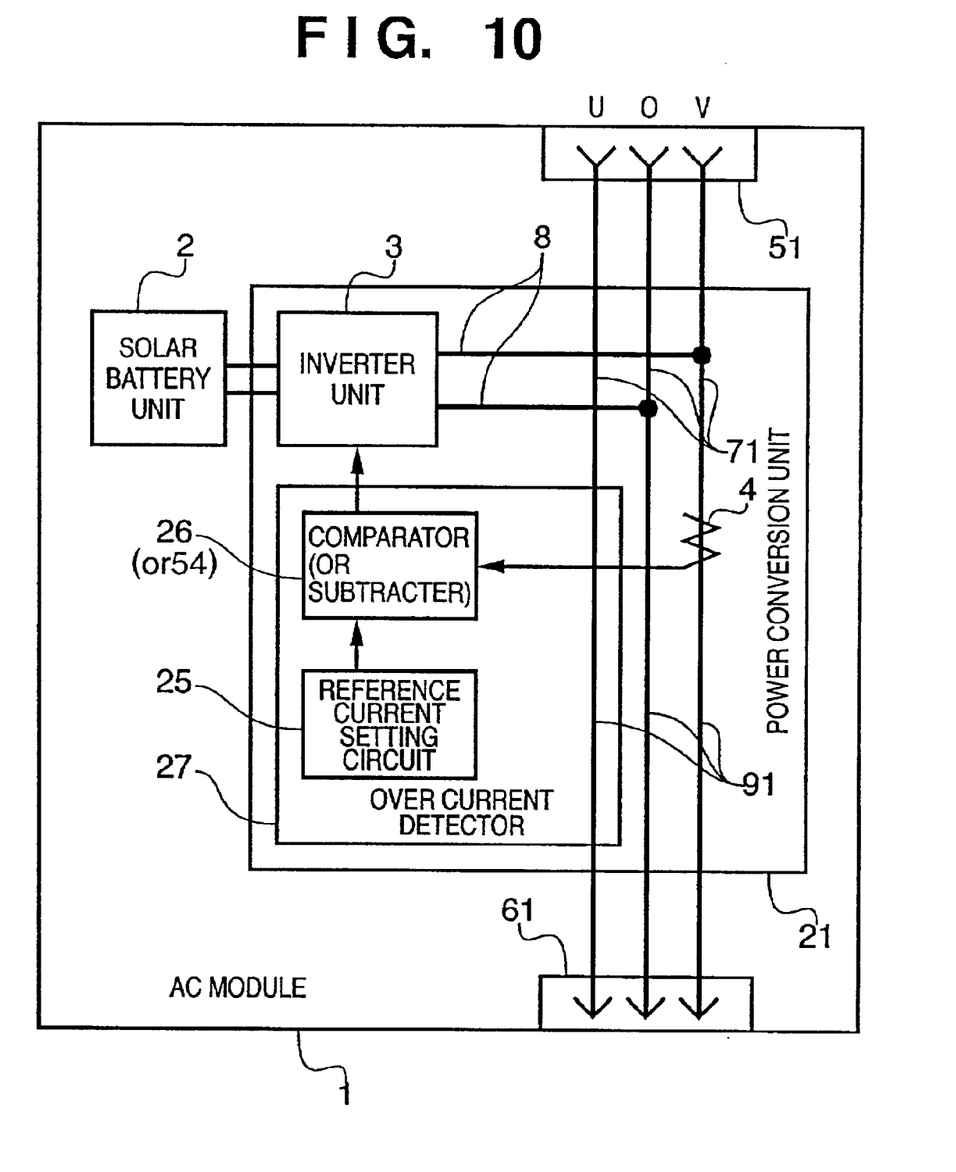
FIG. 10 is a block diagram showing a construction of an AC module connected to a single-phase three-wire system line.
Figure 11:
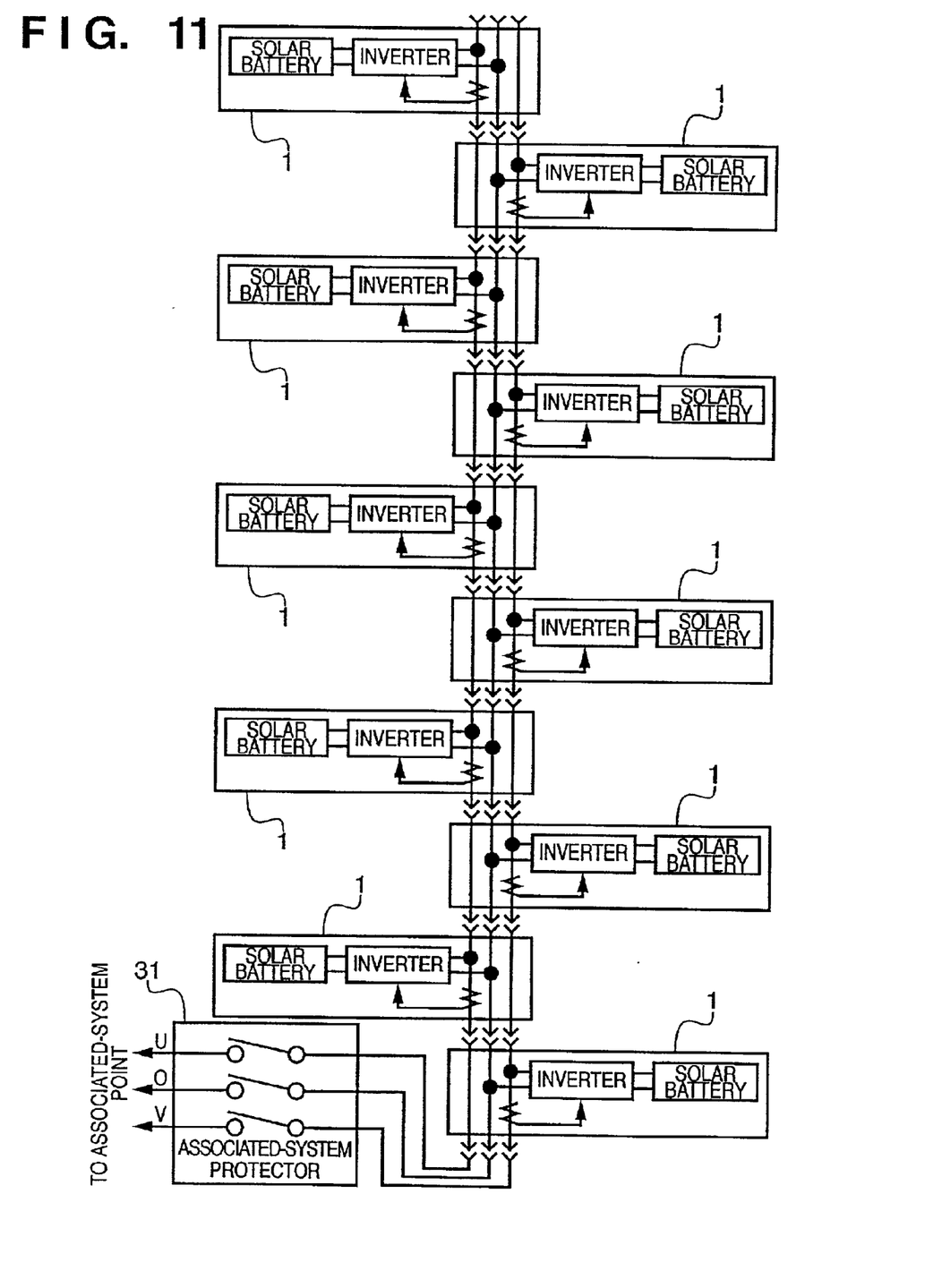
FIG. 11 is a block diagram showing a construction of a photovoltaic power generation apparatus where the AC modules shown in FIGS. 9 and 10 are alternately connected.

FIG. 11 is a block diagram showing a construction of a photovoltaic power generation apparatus where the AC modules 1 shown in FIGS. 9 and 10 are alternately connected. Five of the AC module 1 shown in FIG. 9 are connected to U phase and five of the AC module 1 shown in FIG. 10 are connected to V phase.

The construction shown in FIG. 11 can also prevent over current flow in the collective-power current path 91 and output connector 61.

<Modification of First to Third Embodiments>

Each of the above-described embodiments is applicable not only to a system-association type photovoltaic power generation apparatus, but also to a photovoltaic power generation apparatus which supplies AC power to a load independently of the system.

Furthermore, each of the above-described embodiments employs not only an AC module integrally comprising the solar battery unit 2 and inverter unit 3, but also a DC module having a solar battery unit 2 which integrates a DC-DC converter unit in place of the inverter unit 3.

In other words, the essential concept of each embodiment is to detect a collected current value and stop power output when the detected value exceeds a set value. Therefore, those who are skilled in the art should easily understand that various changes may be made on elements that are not related to the essence of the embodiment.

Figure 12:
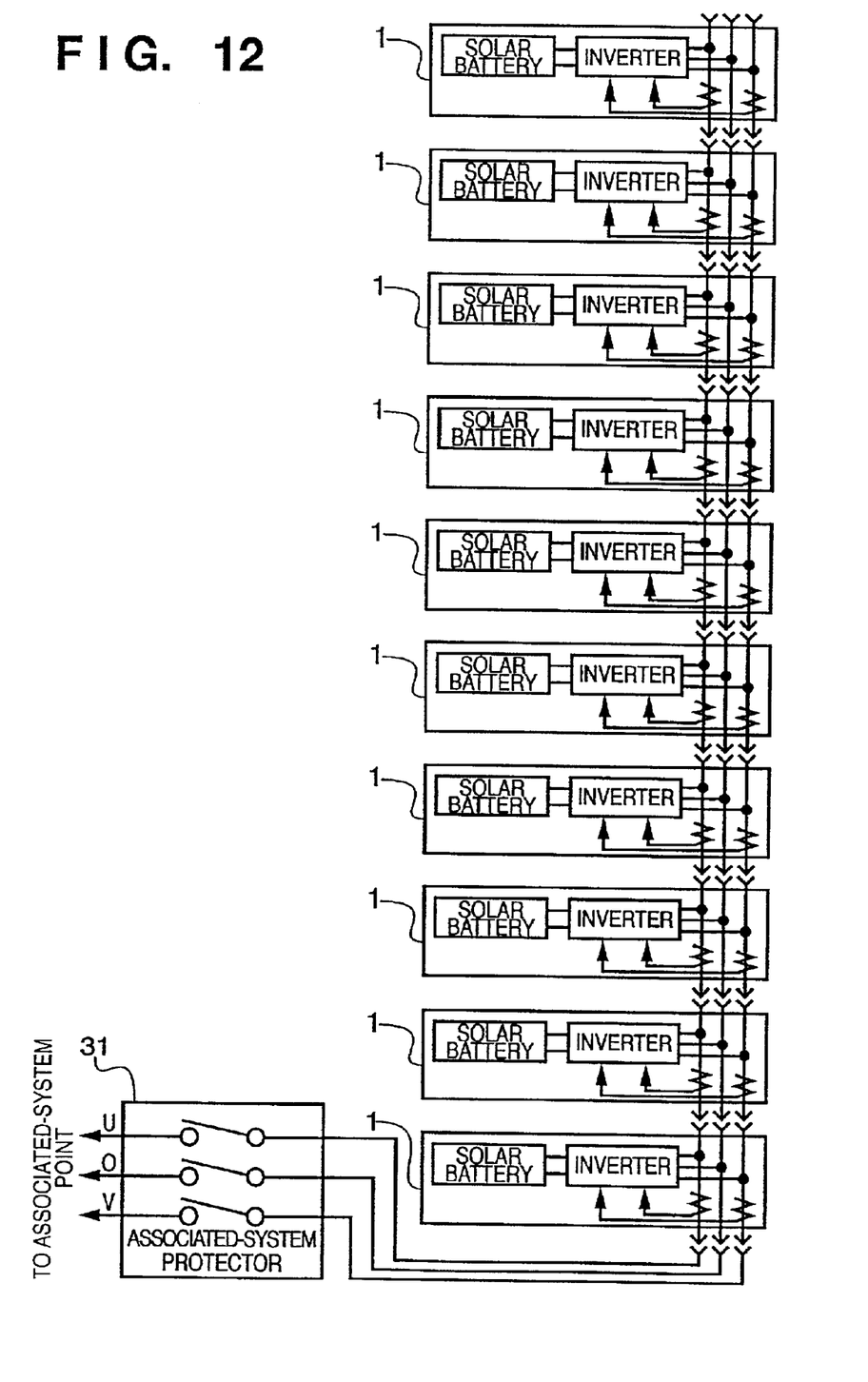
FIG. 12 is a block diagram showing a construction of a photovoltaic power generation apparatus employing an AC module adopting a single-phase three-wire output system.

Furthermore, in a case of employing an AC module 1 which adopts the single-phase three-wire output system as shown in FIG. 12, operation of the inverter 3 is controlled based on a detected current value of the current detector 4, which is arranged in the U-phase and V-phase of the collective-power current path 9, thereby preventing over current flow in the collective-power current path 9 and output connector 6 as similar to each of the above-described embodiments.

<Fourth Embodiments>

Each of the above-described embodiments may be provided with an indicator to indicate the operation halt or operation control state of the inverter 3.

Figure 13:
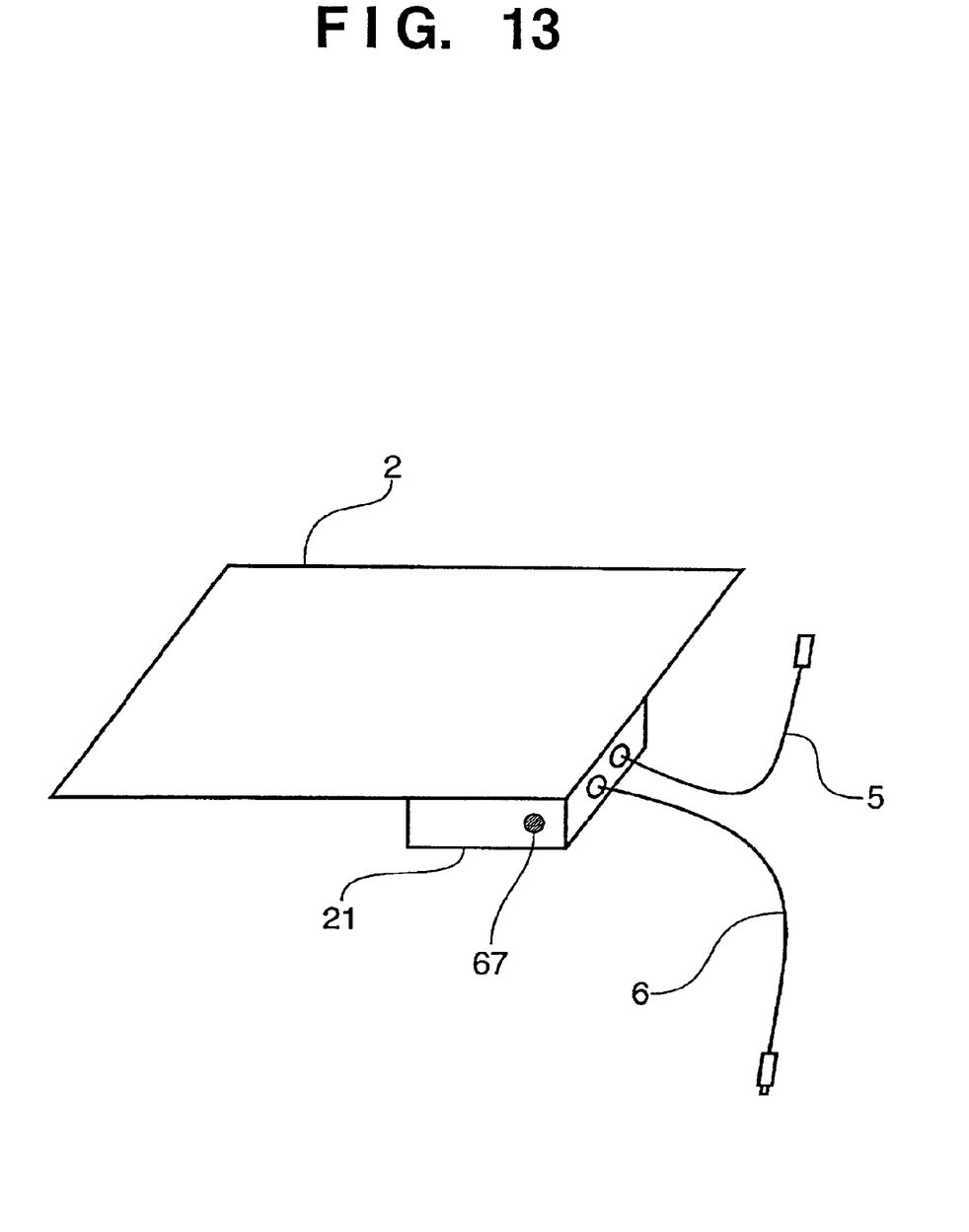
FIG. 13 shows an example where an indicator is provided in a power conversion unit of the AC module.

FIG. 13 shows an example where an indicator is provided in the power conversion unit 21. The lamp 67 e.g., an LED or the like, shown in FIG. 13 is turned on/off by the control circuit 17 when the operation of the inverter 3 is halted or when the output of the inverter 3 is controlled. Alternatively, the lamp 67 may be turned on when the inverter 3 is performing the normal operation and may be turned off or blinked when the operation is halted or the output is controlled.

Instead of providing the lamp 67 in the AC module 1, a signal indicative of operation halt or output control may be outputted by the AC module 1, and a lamp arranged in, e.g., the associated-system protector 31 in correspondence with each AC module 1, may be turned on/off or blinked.

In any case, by virtue of such indicator, an operator of the photovoltaic power generation apparatus is able to know the operation halt or output control state of the inverter 3 due to over current flow. When the operation halt or output control state of the inverter 3 frequently occurs, the operator can take appropriate measures: for instance, decreasing the number of cascade-connected AC modules 1.

The following effects are achieved according to each of the above-described embodiments.

(1) According to the first embodiment, an output of the AC module 1 is halted when a current value of the collective-power current path exceeds a set value. Accordingly, in contrast to the configuration where the associated-system protector 31 detects an over current and disconnects the switch therein, the AC module 1 is halted from the one closest to the associated-system point and other AC modules 1 can continue their operation.

(2) According to the second embodiment, an output of the AC module 1 is reduced when a current value of the collective-power current path exceeds a set value. Accordingly, in contrast to the configuration where the associated-system protector 31 detects an over current and disconnects the switch therein, an output of the AC module 1 is suppressed from the one closest to the associated-system point, and other AC modules 1 can continue their operation.

(3) Since each of the above-described embodiments can prevent an over current flow in the collective-power current path or connector, it is possible to prevent problems in advance even in a case where the number of connections of the AC modules is improvidently increased.

(4) Since an over current flow in the collective-power current path or connector is prevented, it is no longer necessary to have a large rated current for the current path or connector of the AC module 1 on the assumption that the insolation becomes extremely intense. Accordingly, the cost of the AC module 1 can be reduced.

(5) According to the fourth embodiment, the operation halt or output control state of the inverter 3 due to an over current flow is displayed. Therefore, an operator of the photovoltaic power generation apparatus can recognize occurrence of an over current flow and can take appropriate measures, such as changing the connection of the AC modules.

As many apparently widely different embodiments of the present invention can be made without departing from the spirit and scope thereof, it is to be understood that the invention is not limited to the specific embodiments thereof except as defined in the claims.

What is claimed is:

1. A solar battery device which is electrically connectable to at least one other solar battery device in parallel, comprising:
   a solar battery;
   a power converter, structured to convert electric power output from said solar battery;
   an input connector, structured to input electric power from another solar battery device connected in parallel;
   an output connector, structured to collect the electric power input by said input connector and the electric power output by said power converter, and output the collected electric power to outside said device;
   a detector, structured to detect a current value of the collected electric power; and
   a power converter controller, structured to control operation of said power converter so that the current value detected by said detector does not exceed a threshold value which is predetermined based on a maximum rated current value of said output connector or a current path of said output connector.

2. The device according to claim 1, wherein said controller halts output of said power converter in a case where a current value detected by said detector exceeds the threshold value.

3. The device according to claim 1, wherein said controller reduces output power of said power converter in a case where a current value detected by said detector exceeds the threshold value.

4. The device according to claim 1, wherein said input and output connectors are a plug and a receptacle which are connectable to each other, wherein the plug is used for said input connector and the receptacle is used for said output connector.

5. The device according to claim 1, further comprising an indicator, arranged to indicate a control state of an output of said power converter.

6. The device according to claim 1, wherein said power converter is an inverter for converting DC power, output by said solar battery, to AC power.

7. The device according to claim 1, wherein said power converter is a DC-DC converter for converting DC power, output by said solar battery, to DC power.

8. A generator for generating electric power comprising a plurality of solar battery devices, each of which is according to claim 1, wherein the solar battery devices are connected in a cascade.

9. A generator for generating electric power, comprising a plurality of the solar battery devices according to claim 1, wherein said solar battery devices are cascaded for each phase of a power path adopting a single-phase three-wire system.

10. The device according to claim 1, wherein said output connector outputs the collected electric power to another solar battery device connected in parallel.

11. The device according to claim 1, wherein said power converter is structured to convert electric power from only one solar battery, and wherein said power converter controller is structured to control operation of only one power converter.

* * * * *